(12) United States Patent  
Newberry et al.

(10) Patent No.: US 7,831,603 B2  
(45) Date of Patent: Nov. 9, 2010

(54) SYSTEM AND METHOD FOR TRANSMITTING MEDIA BASED FILES

(75) Inventors: Thomas Patrick Newberry, Indianapolis, IN (US); Kerry Wayne Calvert, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1147 days.

(21) Appl. No.: 10/551,085

(22) PCT Filed: Mar. 29, 2004

(86) PCT No.: PCT/US2004/009478

§ 371 (c)(1),
(2), (4) Date: Sep. 27, 2005

(87) PCT Pub. No.: WO2004/088501

PCT Pub. Date: Oct. 14, 2004

(65) Prior Publication Data

US 2006/0242153 A1    Oct. 26, 2006

Related U.S. Application Data

(60) Provisional application No. 60/458,588, filed on Mar. 28, 2003.

(51) Int. Cl.
*G06F 7/00* (2006.01)

(52) U.S. Cl. ........................... 707/755; 707/825

(58) Field of Classification Search ............ 707/1, 707/10, 100, 104.1, 755, 825, 999.107; 709/203, 709/231
See application file for complete search history.

(56) References Cited

U.S. PATENT DOCUMENTS 6,014,706 A * 1/2000 Cannon et al. ............ 709/231
6,292,805 B1    9/2001 Basso et al.

(Continued)

FOREIGN PATENT DOCUMENTS

JP    6-252897 A    9/1994

(Continued)

OTHER PUBLICATIONS

Search Report Dated Aug. 6, 2004.

*Primary Examiner*—Miranda Le
(74) *Attorney, Agent, or Firm*—Robert D. Shedd; Harvey D. Fried; Joel M. Fogelson (57) ABSTRACT

A method and apparatus is disclosed for transmitting a requested media file through a network. A master controller of a server partitions the media object. The master controller of the server then assigns a segment of said partitioned media object to a file partition handler for transmission over the network to a client that requested the media object. The file partition handler transmits the segment over a user datagram protocol port through the network to a client. The master controller then assigns a second segment of said partitioned media object to the file partition handler when the original segment is transmitted successfully to the client. The segmentation of the media object is determined in response to the availability of file partition handlers and the conditions specified by the client.

2 Claims, 5 Drawing Sheets

U.S. PATENT DOCUMENTS

| | | |
|---|---|---|
| 6,453,355 B1 | 9/2002 | Jones et al. |
| 6,460,087 B1 | 10/2002 | Saito et al. |
| 6,633,918 B2 | 10/2003 | Agarwal et al. |
| 6,801,507 B1 * | 10/2004 | Humpleman et al. ........ 370/257 |
| 7,010,801 B1 * | 3/2006 | Jerding et al. ................. 725/95 |
| 7,143,433 B1 * | 11/2006 | Duan et al. ................... 725/115 |
| 2003/0088876 A1 * | 5/2003 | Mao et al. ..................... 725/91 |
| 2003/0188317 A1 * | 10/2003 | Liew et al. .................... 725/88 |
| 2003/0200548 A1 * | 10/2003 | Baran et al. ................... 725/90 |
| 2004/0103437 A1 * | 5/2004 | Allegrezza et al. ............ 725/95 |
| 2004/0158867 A1 * | 8/2004 | Mack et al. .................... 725/95 |

FOREIGN PATENT DOCUMENTS

| | | |
|---|---|---|
| JP | 11-242640 A | 9/1999 |
| WO | WO01/54370 | 7/2001 |

* cited by examiner

SYSTEM AND METHOD FOR TRANSMITTING MEDIA BASED FILES

This application claims the benefit, under 35 U.S.C. §365 of International Application PCT/US2004/009478, filed Mar. 29, 2004, which was published in accordance with PCT Article 21(2) on Oct. 14, 2004 in English and which claims the benefit of U.S. provisional patent application No. 60/458,588, filed Mar. 28, 2003.

FIELD OF THE INVENTION

The present invention relates to the transmission of digital audio and video files, specifically media objects communicated through a network.

BACKGROUND

With the growth in the satellite and cable industries, there has been significant interest in developing architecture for delivering full-length movies to a home multimedia user. One concept of delivery called video on demand (VOD) provides a movie to a user based upon the selection that the user makes. The user may select programming via an electronic programming guide (EPG) that lists available media that may be received through a broadcast service. Once the movie is selected, the broadcast system would transmit the movie to the home user, the transmission either occurring through a cable means (such as a MPEG-2 digital cable transmission), a satellite broadcast (as DBS, DIRECTV™, DISH NETWORK™, etc.), a terrestrial broadcast (UHF, VHF, or broadcast channels for receiving standard definition/high definition programming, etc.), or twisted pair connection (such as DSL, etc.).

The complexity of transmitting a digital video (audio) file, hence forth referred to as a media object, requires that the transmission architecture be capable of handling digital video files of a large size. For instance, the requirements for a media object to be displayed at a "near to motion picture quality" (ex. High Definition Television), as a display format, requires that the transmission architecture requires the network support a throughput of nearly 20 Mbits/sec. The transmission architecture also has to have a low transmission error rate, as to not corrupt the requirements of the video/audio transmission. For instance, DBS satellite systems have to have error rates in the range from $10^{-9}$ to $10^{-11}$ bits to offer an acceptable quality of service (QOS).

The likelihood for an error corrupting the transmission of a media object is reduced if a media object is broken up into discrete segments. Such segments, known as data packets, separate the media object into individual divisions that are reconstituted at a receiving end of the transmission architecture. One used technique for packetizing data files complies with the MPEG-2 data-encoding standard to create a data stream (see MPEG-2 Specification ISO-13818-1) for encoding and transporting discrete data packets.

Such techniques for transmitting media objects are however not an efficient use of bandwidth. Other known techniques for transporting media objects such as file transport protocol (FTP) are limited to physical constraints where only 300 Kilobytes per second can be transmitted, regardless of the available link speeds of the underlying connection. Additionally, some media object transportation techniques are capable of utilizing the available bandwidth of a connection. Such techniques though use redundant packets in the transmission of a media object that may require an encoding overhead of twice the size of the original media object. Hence, such media object transmissions inefficiently use half the available bandwidth for error correction.

SUMMARY OF THE INVENTION

A system and method for assigning transmitting a media object through a network based on the physical capabilities of such a network. The media object is parsed into multiple partitions that are segmented are transmitted to a client, based on the availability of access points and resources at the client side and the network connections between such access points and a server transmitting such a media object.

BRIEF DESCRIPTION OF THE DRAWINGS

The above and other advantages and features of the present invention will be better understood from the following detailed description of the preferred embodiments of the invention, which is provided in connection with the accompanying drawings. The various features of the drawings may not be to scale. Included in the drawing are the following figures.

DETAILED DESCRIPTION OF THE INVENTION

Although the invention is described in terms of exemplary embodiments, it is not limited thereto. Rather, the appended claims should be construed broadly, to include other variants and embodiments of the invention, which may be made by those skilled in the art without departing from the scope and range of equivalents of the invention.

The present invention is a system and method for transmitting and receiving audio, video, or a combination of both types of media as a media file or "media object". As used herein, the term "media object" includes audio, video, textual, multimedia data files, and streaming media files. Multimedia objects comprise any combination of text, image, video, and audio data. Streaming media comprises audio, video, multimedia, textual, and interactive data files that are delivered to a user via the Internet, satellite or other communications network environment and begin to play on the user's computer/device before delivery of the entire file is completed. Media objects may be transmitted over any communications network including via the Internet, satellite (DSS, DVB-S), cable, DSL, T1 lines, wireless network, or other delivery systems capable of delivering media objects.

Examples of the content of media objects include songs, political speeches, news broadcasts, movie trailers, movies, television show broadcasts, radio broadcasts, financial conference calls, live concerts, web-cam footage, and other special events. Media objects are encoded in various formats including REALAUDIO®, REALVIDEO®, REALMEDIA®, APPLE QUICKTIME®, MICROSOFT WINDOWS® MEDIA FORMAT, QUICKTIME®, MPEG-2 VIDEO COMPRESSION, MPEG-4 VIDEO AND/OR AUDIO COMPRESSION, JOINT VIDEO TEAM COMPRESSION FORMAT (MPEG-4 part 10 AVC, H.264), MPEG-2 LAYER III AUDIO, MP3®. Typically, media objects are designated with extensions (suffixes) indicating compatibility with specific formats. For example, media objects (e.g., audio and video files) ending in one of the extensions, .ram, .rm, rpm, are compatible with the REALMEDIA® format. Some examples of file extensions and their compatible formats are listed in the Table 1. A more exhaustive list of media types, extensions and compatible formats may be found at http://www.bowers.cc/extensions2.htm.

TABLE 1

| Format | Extension |
| --- | --- |
| REALMEDIA ® | .ram, .rm, .rpm |
| APPLE QUICKTIME ® | .mov, .qif |
| MICROSOFT WINDOWS ® MEDIA PLAYER | .wma, .cmr, .avi |
| MACROMEDIA FLASH | .swf, .swl |
| MPEG | .mpg, .mpa, .mp1, .mp2 |
| MPEG-2 LAYER III Audio | .mp3, .m3a, .m3u |

The preferred embodiment of the invention operates with media objects that contain video data for presenting a video presentation of "near to motion picture quality". Such media objects may be encoded in a variety of formats such as MPEG-2 (Motion Picture Standards Group Standard ISO/IEC 13818-1:2000) and ITU-T H.264/MPEG AVC (ISO/IEC 14496-10), or may be uncompressed. Furthermore, the described embodiments of the present invention are also to be used in the professional areas for applications such as the post-production of movies or television shows and for other applications requiring the transmission of large media objects.

Figure 1:
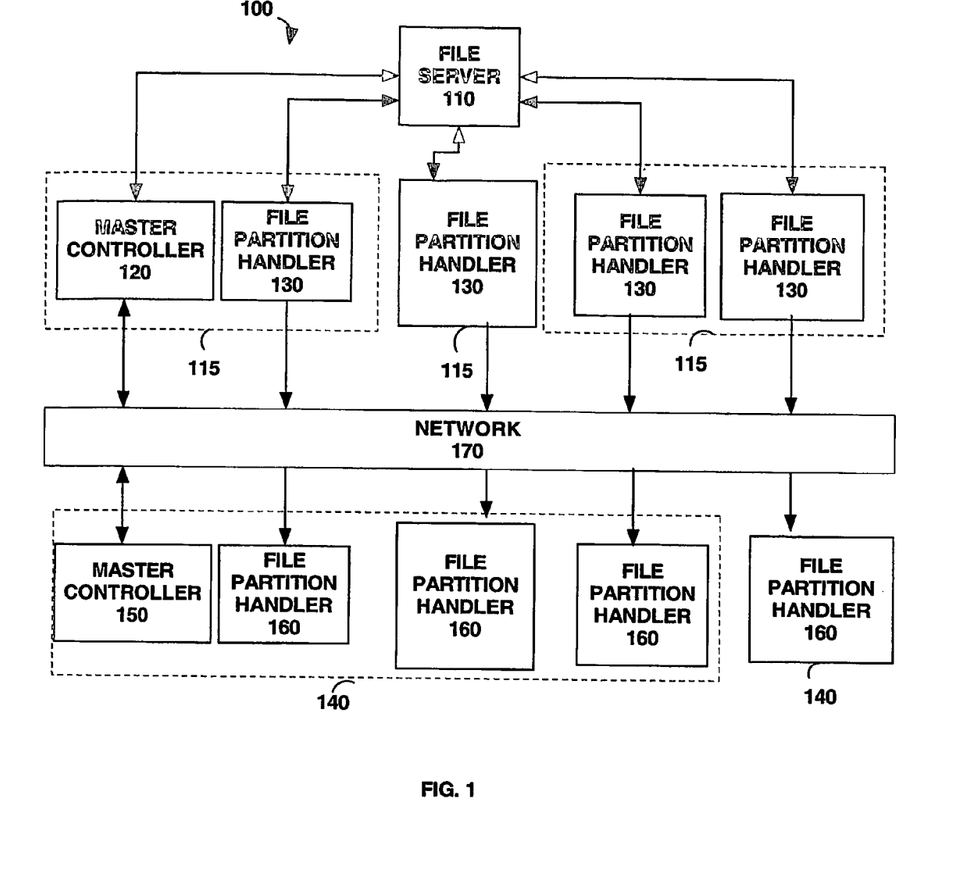
FIG. 1 is a system diagram in accordance with an exemplary embodiment of the present invention.

In FIG. 1, a transmission system in accordance with the present invention is shown. System 100 displays an embodiment of a transmission system for transporting a large media object to clients 140. File server 110 is a storage device such as a matrix of hard drives having a capacity of Terabytes and/or Gigabytes capable of storing multiple media objects. File server 110 is coupled through a local area network to servers 115 that house control components such as master controller 120 and to file partition handlers 130. Server 115 preferably comprises a host computer or a series of computers that are capable of transmitting a media object transmitted through network 170. It is to be noted that any disclosed master controller and file partition handler may be implemented as hardware, software, or as a combination of hardware and software, in accordance with the principles of the present invention.

Master controller 120 manages the transport of a partitioned media object through network 170 to clients 140. Master controller 120 also coordinates the operation of file server 110 and file partitions handlers 130 for segmenting of a media object into multiple partitions. File segmentation is based on the availability of resources on the client side requesting the media object effecting both the segmentation of the media file and error recovery of such transmitted segments. The control communications between master controller 120 and client 140 are preferably handled through TCP/IP compliant network connection.

File partition handler 130 is responsible for retrieving and transporting the appropriate segment of a media object in accordance with the instructions issued from master controller 120. File partition hander 130 preferably transports its associated file segment to client 140 using a UDP based protocol over a network connection as described in Postel, J., "User Datagram Protocol," Request For Comments 768, USC/Information Sciences Institute, August 1980. A group of file partition handlers 130 ideally transmit their respective segments or packets in a simultaneous or parallel fashion, so the transmitted data received at a client 140 in a contemporaneous manner.

Network 170 may be any type of network known in the art. Preferably, such a network is capable of accommodating multiple connections between resources at a server side of a server and at the client side of a client, such connections being UDP based, TCP/IP based, or a mixture of both. The bandwidth accommodated by network 150 is preferably a large bandwidth connection such as a T1 connection (1.5 Megabits per second, Mbps), T3 connection (45 Mbps), DS3 connection (45 Mbps), OC3 connection (155 Mbps), OC12 (248000 Mbps), and the like.

Client 140 preferably comprises a host computer or a series of computers that are capable of receiving a media object transmitted through network 170. Preferably, each client 140 has a series of access points or nodes that is associated with an IP address and a port address. Such access points are shown as master controller 150 and file partition handlers 160, at the client side.

A segment of a partitioned media object is transmitted by file partition handler 130 to the IP address and port of an access point of client 140 via UDP, as described above. Access points may also be identified by a corresponding Network Interface Card address (NIC address) or Media Access Control address (MAC) address associated with an access point associated with client 140, this case being a file partition handler 160, although a client 140 may not have such a component. The segments of the media object received by the access points of client 140 are then reconstituted into the media object, when completely received. Missing segments of the media object are replaced using the techniques described later in this specification. It should be noted for the operation of the invention that master controller 120 and file partition handler 130 may occupy the same server 115, or may occupy several servers 115. Additionally, master controller 150 and file partition handlers 160 may occupy the same client 140, or may occupy several clients 140, depending on the requirements of the desired transmission system. The principles of the present invention may be applied to other distributed networking environments where multiple servers 115 or clients 140 are used to transmit and/or receive the same media object.

Figure 2:
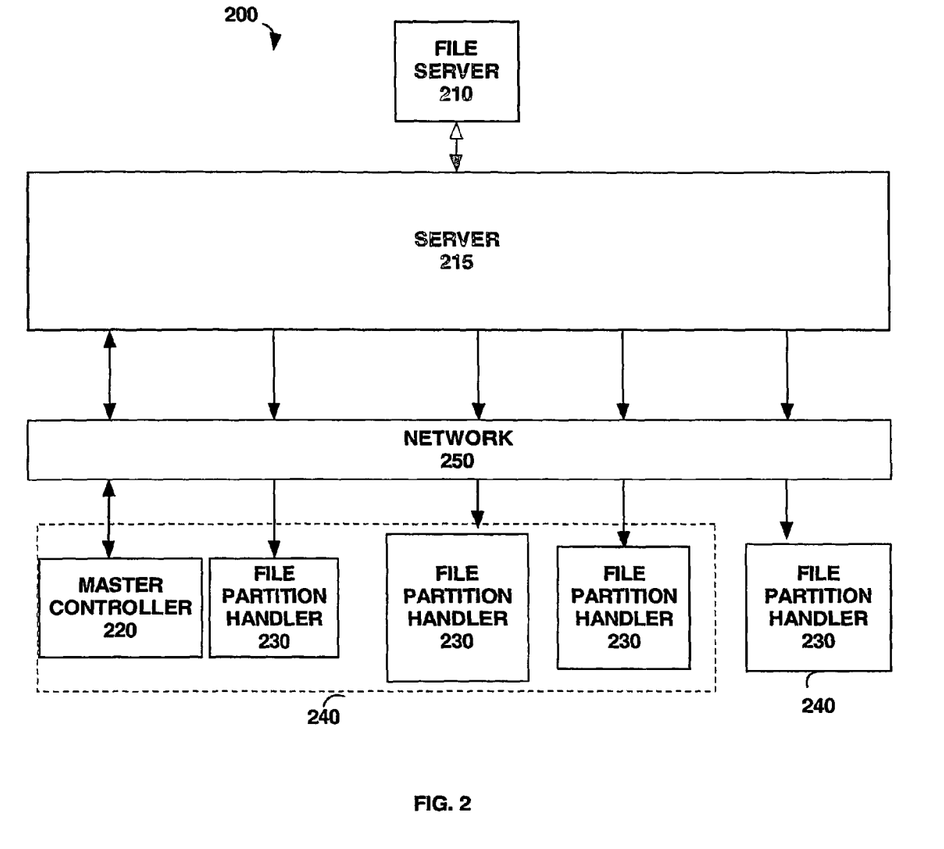
FIG. 2 is a system diagram demonstrating a transmission of a partitioned media object to a single client in accordance with an exemplary embodiment of the present invention.

FIG. 2 presents an embodiment of the present invention for transferring a segmented media object to a single client 240. In this embodiment of the present invention, system 200 has client 240 requesting a media object over network 250 to server 215, where the media object is stored in file server 210. In this embodiment, client 240 possesses master controller 220 for issuing the request for the media object and for configuring the file partition handlers 230 available for receiving a segmented media object. Master controller 220 through the use of a TCP/IP based transmission indicates to server 215 which corresponding UDP ports of file partition handlers 230 are to receive a corresponding file segment and a requested media object is to be segmented. Master controller 220 concatenates the received segments when all of the segments are successfully retrieved from file partition handlers 230 over their respective UDP connections through network 250.

Figure 3:
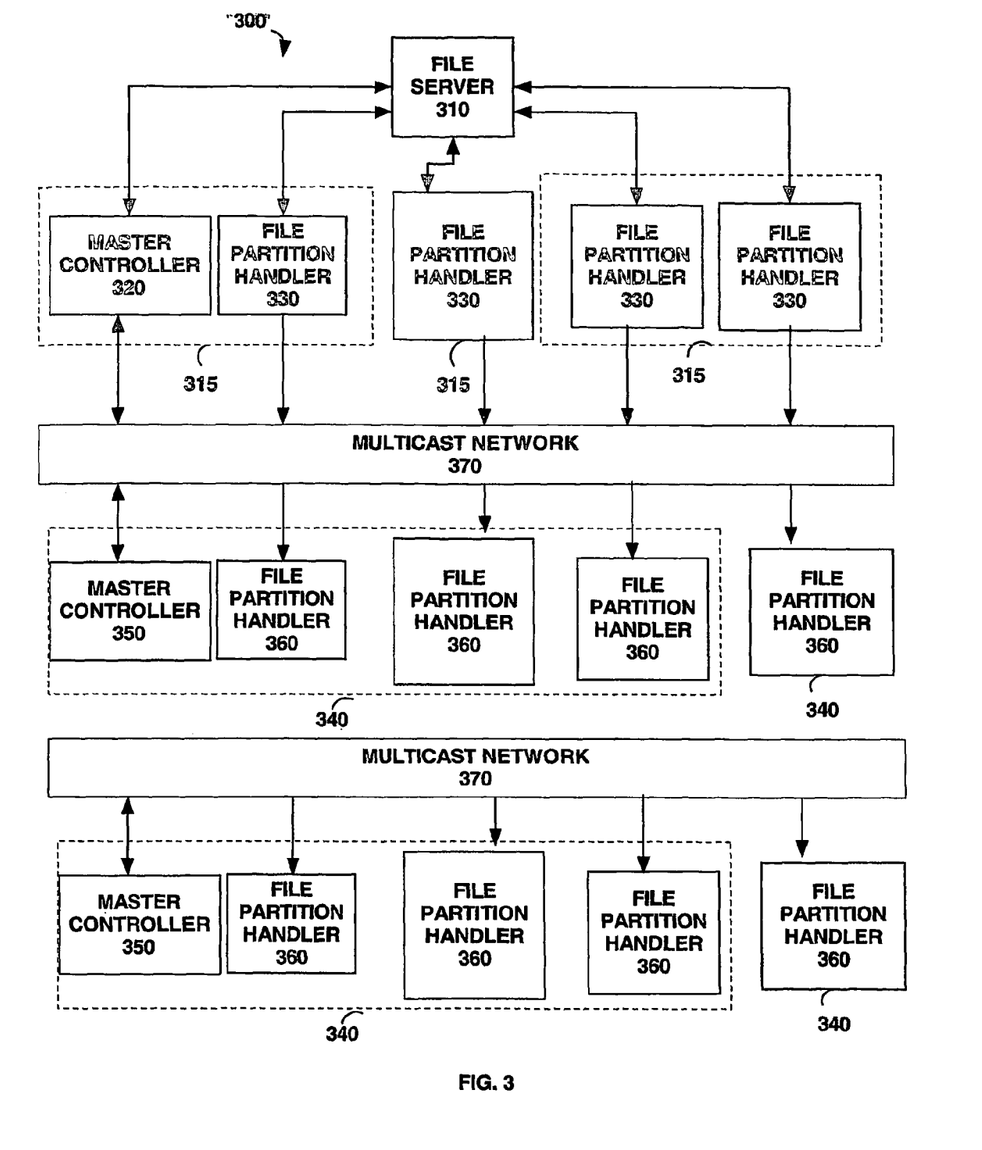
FIG. 3 is a system diagram demonstrating the transmission of a segmented media object via a multicasting operation in accordance with an exemplary embodiment of the present invention.

FIG. 3 presents an embodiment of the present invention for transferring a segmented media object to multiple clients 350 using an IP multicasting architecture as described in Thaler, D., "Interoperability Rules for Multicast Routing Protocols," Request For Comments 2715, Microsoft, October, 1999.

In this embodiment, at least two clients 340 are present where each client 340 has a corresponding master controller 350 for issuing a request for a media object stored in file server 310. Each master controller 350 though has to account the delays required to synchronize all clients 340 requesting a media object. The request for media object is established by each master controller 350 to server 315 which then multicasts the segmented media object to the corresponding file partition handlers 360 of client 340, or a single master controller 360 specifies the IP addresses to where the segments of media object should be transmitted via an IP multicast through multicast network 370. The transmission of the file segments to file partition handlers 360 and the reconstitution of such received file segments into a media object at clients 340 is similar as described in the specification for FIGS. 1 and 2.

Alternatively, master controllers 350 operate in conjunction with master controller 320 of server 315 to receive a partitioned media object. Master controller 320 informs master controllers 350 which multicast addresses will be used to transmit a segment of a partitioned media object. The respective master controller 350 will command their respective file partition handlers to receive such segments through multicast network 370.

Figure 4:
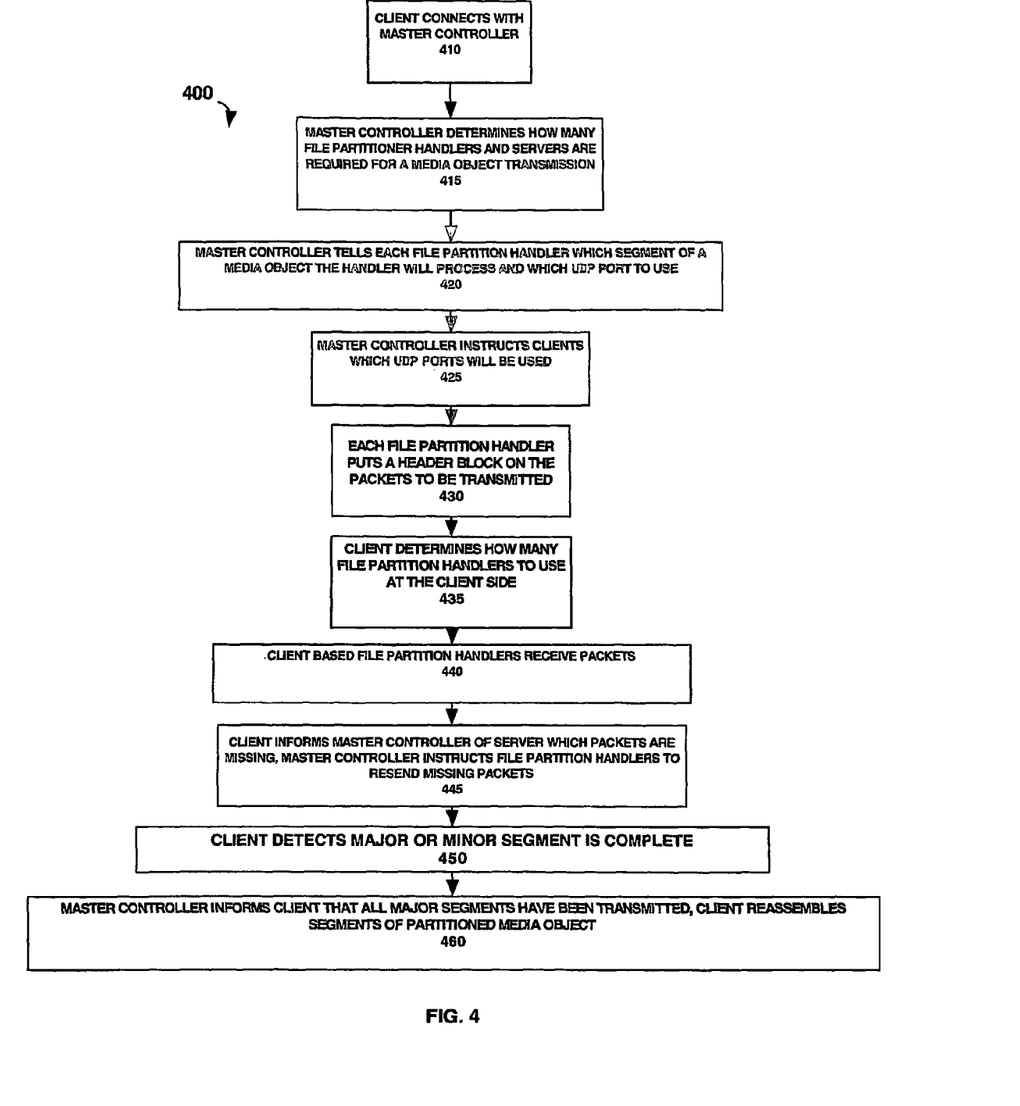
FIG. 4 is a flow chart of a transmission process that segments a media object into multiple partitions in accordance with an exemplary embodiment of the present invention.

FIG. 4 is a flowchart of a method 400 for transmitting a media object, in accordance with an embodiment of the present invention. The steps presented for the flow chart are presenting in view of FIG. 1. In step 405, client 140 connects via network 170 with master controller 120, associated with server 115. The connection is established through a TCP/IP socket, where client 140 identifies the media object to be transferred. During this step, client 140 also specifies the communication rate for the transmission of the media object.

In step 415, master controller 120 determines the number of file partitions handlers 130 necessary to meet the required communication rate set forth by client 140. This step may also include that multiple servers be involved in the transmission of a segmented media object. Step 420 has master controller 120 instructing each partition handler 130 as to which segment of the media object and what UDP port will be used to transmit to client 140.

Step 425 involves master controller 120 instructing client 140 of the UDP ports required to download the segments of the media object that will be eventually transmitted. Also, control information is transmitted by master controller 120 to client 140 indicating the how many packets will be coming in from a UDP port for a particular segment of the divided media object. Step 430 has each file partition handler 130 putting a header block on its packets that are to be transmitted on its assigned UDP port. Preferably, the header block are sequentially generated in numerical order. The packets are then transmitted to client 140.

Client 140 then determines what client based file partitions handlers 160 are to be used in step 435, and what servers to activate to receive the transmitted files. In step 440, the client based file partition handlers 160, as access points, receive packets representing the transmitted segments of a media object, on a corresponding UDP port. The sequence identifiers in the header block of the received packets determine how to reconstruct the received segment of the media object.

If any packets are missing for a particular file partition handler 160, step 445 has client 140 notifying master controller 120 through the TCP/IP connection which packets are missing and are required to be retransmitted by a corresponding file partition handler 130. Preferably, client 140 has a client side master controller 150 for communicating with the master controller 120 at the server side. In step 450, client 140 instructs master controller 120 that a particular segment of the media object has been completely received. If the complete download of the media object is not complete, the client 140 further instructs master controller 120 to transmit and additional segment of the media object using new parameters (as done in steps 420 to 445).

Step 460 has master controller 120 informing client 140 that all segments of the partitioned media object have been transmitted. Client 140 then reconstructs the media object using the received segments of the media object.

Figure 5:
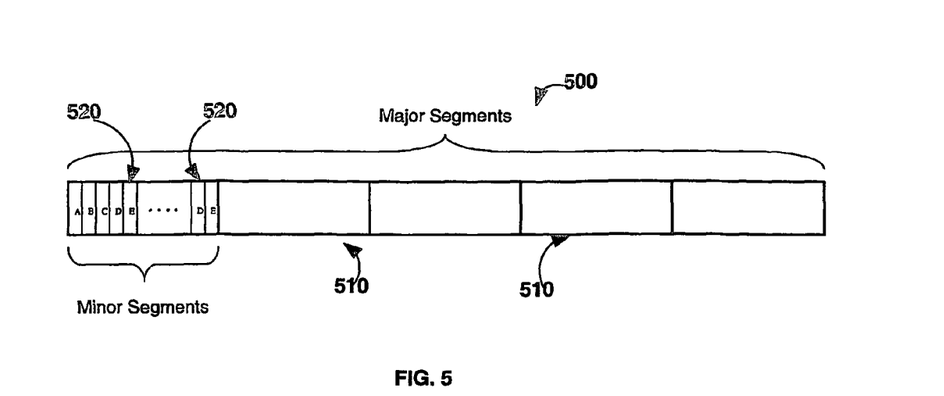
FIG. 5 presents an exemplary embodiment of a file segment of a partitioned media object.

FIG. 5 shows an exemplary embodiment of a file segment of partitioned media object. As shown in the figure, the file segment comprises major segments 510 and minor segments 520. Major segments 510 are used by client 140 and server 115 as the major segment boundaries, where a major segment 510 is a large "block" used to send a file segment. Minor segment 520 is the smaller "blocks" which are used to construct a major segment 510. In the preferred embodiment of the present invention, a major segment 510 has to be completely received by client 140 before a second major segment 510 is transmitted. If a major segment 510 is not completely received, client 140 tells master controller 120 what minor segment 520 of said major segment 510 to retransmit, where each minor segment 520 corresponds to a particular file partition handler 130 of server 115.

In a unicast transmission, master controller 120 designates a major segment 510 to a group of file partition handlers 130. Each file partition handler 130 is then assigned a part of major segment 510 as a minor segment 520 that are transmitted as UDP packets. Upon the successful transmission of the minor segments 520 used to construct major segment 510, each file partition handler 130 informs master controller 120 that the transmission of the major segment has completed. Master controller then will issue a second major segment 520 to be divided up and transmitted by file partition handlers 130 to client 140, as previously described.

Advantageously, master controller 120 may be configured to build a pipeline of major segments 510, eliminating the need for idle time while master controller 120 processes a message from client 140 indicating a change in network conditions. The size of major segments 510 may also be modified in response to network conditions. For example, a major segment 510 may be composed of ten minor segments 520. In the case where the loss of packets is minor, the size of a major segment 510 would be increased to twelve minor segments 520. Alternatively, in the case where the loss of packets is substantial, the size of major segment 520 would be reduced to eight minor segments 520. The adjustment in the amount of minor segments may be modified in accordance with the principles of the present invention.

It is also contemplated that if the number of minor segments 520 in a major segment 510 would stay the same; the physical size (kilobytes) of a major segment 520 would be modified in accordance with network conditions. Such a determination is preferably made by master control 145 of client 140. Alternatively, master controller 120 may also eliminate the use of major segments 510 and rely on the use of minor segments 520 which are generated as contiguous blocks of data. File partition handlers 130 then transmit these minor segments 520 to client 140, where each file partition handler 130 informs master controller 120 about the successful transmission of each minor segment 520. Master controller 120 then assigns a file partition handler 130 a new minor segment 520 to be transmitted, repeating this process until all of he minor segments 520 of a segment of a partitioned media object are successfully transmitted.

In the case of a unicast (or a one client) transmission, the invention provides several recovery schemes in the case where packets are lost during such as transmission. In one embodiment, master controller 120 is capable of adding additional file partition handlers 130 to transmit data packets. Alternatively, master controller 120 assigns the task of re-sending packets to a preexisting file partition handler 130.

A second scheme for packet loss protection involves master controller 120 keeping a linked list of lost packets. In this embodiment, master controller 120 and file partition handlers 130 of server 115 transmit all of the major segments 510 and minor segments 520 of a partitioned media object, this transmission being known as a "first pass". The contents of the linked list are used by master controller 120 to indicate the packets lost during the "first pass" transmission. Server master controller 120 then coordinates a "second pass" transmission with file partition handlers 130 and client 140 to rebroadcast the packets of major segments 510 and minor segments 520 that were not successfully received during the "first pass" transmission. This procedure is repeated until a threshold of successfully received packets by client 140 is reached.

Additional packet loss techniques include either server side master controller 120 or client side master controller 150 monitoring the respective resources on their respective side. For example, if a particular file partition handler 130 on the client side keeps on timing out or if client 140 stops responding, master controller 120 may cancel the job assigned to the file partition handler 130 and reassign the job (of transmitting data) to a second file partition handler 130, or reassign a major segment 510 to a group of file partition handlers 130. Master controller 120 notifies a user about this time-out failure.

Alternatively, master controller 150 by keeping track of statistics on the client side may discover that a UDP address continuously loses packets. Master controller 150 then informs server side master controller 120 that there is a problem with the UDP address, indicating a faulty file partition handler either at the server or client side of the system. Master controllers 120 and 150 then coordinate the transmission of packets to a new UDP address, which may involve the use of new file partition handlers. These embodiments also contemplate that either master controller 120 or 150 may be used to implement the described timing out or UDP failure packet loss schemes, described above.

Figure 6:
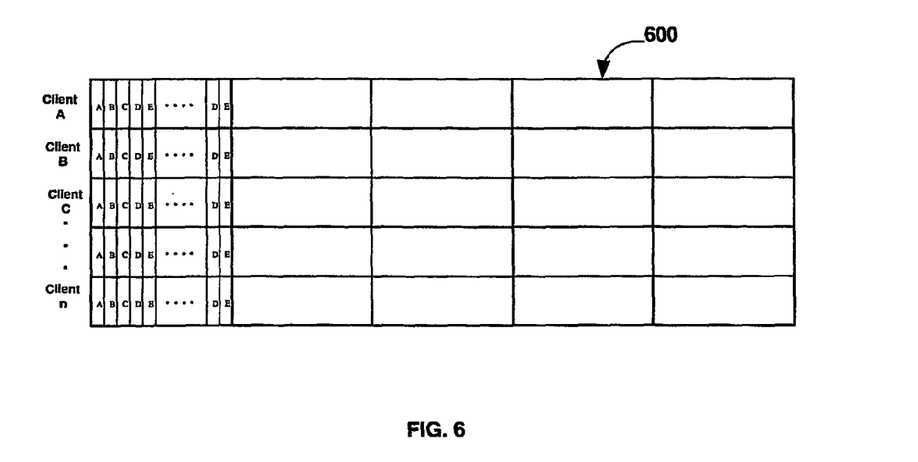
FIG. 6 presents a two-dimensional array indicating packet loss during a multicast transmission of a partitioned media object, in accordance with an exemplary embodiment of the present invention.

Packet loss techniques for multicast transmissions require that the master controller of a server be prepared to utilize different methods to stem the loss of transmitted packets. Referring to FIG. 3, server master controller 320 maintains a linked list of packets that are lost during the transmission of major segments 510 and minor segments 520 of a segmented media object, similar to the linked list used for unicast transmissions. The modification to this linked list, as shown in FIG. 6, occupies a two-dimensional array where lost packets (minor segments) that were lost in respect to all clients 340. A "first pass" transmission of a partitioned media object is completed when all of the major segments 510 of the media object are transmitted. The linked list updated by master controller 320, upon the completion of each transmitted major segment 510.

Master controller 320 then uses the contents of the linked list to rebroadcast the data packets not successfully received by clients 340 during the "first pass". This "second pass" transmission has major segments 510 and minor segments 520 being transmitted with the "lost packet" information. This process is repeated until all clients 340 receive all the segments of a partitioned media object. It is to be noted that the multicast transmission model also allows master controller 320 to utilize the timing out and the UDP packet loss schemes described in regards to the unicast transmission model described above.

Optionally, the present invention provides for additional embodiments utilize control-processing schemes to benefit the transmission techniques used to transmit a partitioned media object. Specifically, the invention provides the operation where a transmission technique used to transmit a media object may be changed, in accordance with the requests made for such a file.

For example, a media object is currently being transmitted as a UDP transmission using the unicast technique described above. A second request for the same file comes in to a server during the course of this transmission. Referring to FIG. 3, a client side file partition handler 330 of client 340 finishes receiving a segment of the partitioned media object. File partition handler 330 then awaits further instructions as to how to proceed to receive a new segment of the partitioned media object. Client master controller 350 (of the client that received the segment) informs server master controller 320 that the client 340 has successfully received the transmitted segment. Preferably, this communication takes place at the boundary of a major segment 510, although the system may also have the communication take place for minor segments 520.

Master controller 320 informs client master controller 350 that the next segment of the media object will come from a new address, specifically a multicast address. Client master controller 350 then instructs a file partition handler 330 to receive the next segment of the media object from the designated multicast address. In the interim, master controller 320 designates that a file partition handler 330 start transmitting this next segment of the media object in the form of multicast packets from the designated multicast address. All other newly added clients 340 requesting the media object will be instructed to receive segments of the media object from this multicast address, as well.

Master controller 320 will transmit all of the segments of a partitioned media object to clients 340 until of all the segments have been received. The packet loss techniques, described above, may be used to buttress the transmission of data.

In the case where a client 340 or a group of clients 340 request the same media object during the course of an ongoing multicast transmission, master controller 320 informs all of the new clients 340 to join the multicast in progress at the next major segment 510 boundary. This is done by having master controller 320 transmit the multicast address of corresponding file partition handlers 330 transmitting segments of the requested media object. All synchronization and control communications are preferably communicated between master controllers 320 and 350 through TCP/IP sockets.

Additionally, the rebroadcast of multicast segments are preferably performed through TCP/IP interfaces, as well. It should be noted that other control communications might be used, in accordance with the principles of the present invention.

The described system of the invention provides that a client side or server side master controller be capable of reconfiguring the use of resources, especially file partition handlers. For rate control operations, a client may request that a server transmit a partitioned media object at a desired communication rate. The master controller of the server would then determine how the file partition handlers of the server should be utilized in response to such as request. Additionally, a client may request that a media object be transmitted using priority mechanisms or rules such as "use 20% of the available bandwidth from 08:00 to 17:00, otherwise use 90% of the available bandwidth". The master controller of the server would modify the use of file partition handlers, as well in response to such a request. Similarly, a server on its own initiative may specify a limit to bandwidth used to transmit a partitioned media object. In the preferred embodiment of the present invention, the server and client will seek to utilize all available transfer resources to achieve the highest possible transfer rate.

The invention is configured to be self-teaching about system performance so that better decisions about resource allocation can be made for the future transmission of partitioned media objects. Statistics are gathered on Central Processing Unit (CPU) utilizations, NIC throughput, transmission error rates, and end-to-end transfer speeds. The statistics are gathered during a file transfer via the Operation System and other third party monitoring tools. The master controller, either at the client or server side, derives network throughput by measuring how long it takes for the client to process a segment.

With the information about system performance, the master controllers of the client and server may adjust their assumptions about how a media object should be partitioned, how many file partition handlers should be used, and how network latency and error rates for a specific client or server should be taken into account.

Commands communicated between the servers and clients are described below in Tables 2-8. Table 2 discloses an exemplary embodiment of a transfer request command that a client issues to a server to initiate a transfer of a requested media object.

TABLE 2

| Element | Bytes | Usage |
| --- | --- | --- |
| Message Type | 1 | Identifier to indicate this is a file transfer request |
| Filename | 100 | The name of the file that this segment is associated with |
| Comm Rate | 1 | Indicator of what communications speed the transfer should be conducted at |
| Multicast | 1 | Indicator as to whether it is acceptable to use multicast to fulfill the request |
| Session ID | 4 | Set if Message Type is for a Restart Job |

Table 3 discloses the format of an exemplary data control command used by a file partition handler of a server to inform a client about the number of packets that should be expected for transmission for a specified segment of a partitioned media object. Also this command is used for identifying where in the final file copy a received segment (major or minor) should be placed.

TABLE 3

| Element | Bytes | Usage |
| --- | --- | --- |
| Marker | 7 | The literal "CONTROL" |
| Segment ID | 4 | Identifier of the segment |
| Filename | 100 | The name of the file that this segment is associated with |
| Offset | 8 | The offset in the final file at which this segment should be placed |
| Number | 4 | Number of packets that will be received in this segment |
| CRC | 4 | CRC check of previous 121 bytes to validate packet integrity |

Table 4 discloses the format of an exemplary data packet used to transmit data from the server to a client. Specifically, this data packet format is used to form major and minor segments of a partitioned media object.

TABLE 4

| Element | Bytes | Usage |
| --- | --- | --- |
| Sequence ID | 4 | Orders data packets within the segment being transmitted |
| Length | 4 | Number of bytes in the packet |
| Data | NA | The data bytes for the packet, of length specified in Length element |
| CRC | 4 | CRC check of the data to validate packet integrity |

Table 5 discloses the format of an exemplary retransmit command that is used by a client to request the retransmission of an identified packet that was not successfully received. Such a command is transmitted to the server responible for transmitting the lost packet.

TABLE 5

| Element | Bytes | Usage |
| --- | --- | --- |
| Message Type | 1 | Identifier to indicate this is a packet retransmit request |
| Segment ID | 4 | ID of segment for which packets are missing |
| Length | 4 | Number of packet identifiers supplied in Packets element |
| Packets | Variable | The identity of each packet lost is filled in here |

Table 6 discloses the format of an exemplary configuration command that is transmitted from a server to a client indicating the start of a file transfer. This command specifically indicates to the client what IP address or port to use to receive data from the server.

TABLE 6

| Element | Bytes | Usage |
| --- | --- | --- |
| Message Type | 1 | Identifier to indicate this is the configuration message |
| Session ID | 4 | Identifier for job, used for restart |
| Protocol | 1 | Indicates whether to use UDP or Multicast based Protocol |
| Streams | 1 | Number of streams to connect to |
| Stream Address | Variable | Array of IP Address/Port number to connect to for receiving file segments |

Table 7 discloses the format of an exemplary partition command that is used by a master controller of a server and is communicated to the file partition handlers used to transmit a major/minor segment. Such a command indicates how a media object is to be partitioned among file partition handlers.

TABLE 7

| Element | Bytes | Usage |
|---|---|---|
| Message Type | 1 | Identifier to indicate this is the partition message |
| Protocol | 1 | Indicates whether to use UDP or Multicast |
| File Name | 255 | Path name of file to open for transmitting |
| Offset | 8 | Offset in file for reading data from |
| Bytes | 4 | Number of bytes to transmit in segment |

Table 8 discloses the format of a segment complete command that is communicated by a client side master controller to a server when a file partition handler indicates that it has completed processing a segment. The server's file partition handler processing the completed segment will be notified of the next segment of a partitioned media object to process. The file partition handler will then issue a data control command to the client, in accordance command shown in Table 3.

TABLE 8

| Element | Bytes | Usage |
|---|---|---|
| Message Type | 1 | Identifier to indicate this is the segment complete message |
| Segment ID | 4 | Identifier of the segment for which processing is complete |

The invention claimed is:

1. A method of segmenting a media object for transmission over a network, comprising the steps of:
   partitioning a video media object into at least two segments;
   assigning at least one of said segments to a file partition handler;
   transmitting said at least one segment using an assigned user datagram protocol port, wherein said at least two segments are sent to unique user datagram protocol ports at the same client device in parallel;
   notifying a master controller that a file partition handler has transmitted said at least one segment,
   wherein said master controller operates at least two file partition handlers where at least one segment of said partitioned media object' constituting a major segment, is broken into minor segments, each minor segment being assigned to a file partition handler by said master controller,
   wherein said minor segments are successfully transmitted by said at least two file partition handlers before a second major segment is broken into minor segments and transmitted by said file partition handlers,
   wherein said master controller keeps track of lost segments not successfully transmitted in a linked list,
   wherein said master controller causes said file partition handler responsible for said lost segment to retransmit said lost segment,
   wherein said master controller reassigns said segment of said partitioned media object to a second file partition handler in response when said file partition handler fails to deliver said segment,
   wherein said master controller communicates with a second master controller using a Transmission Control Protocol and Internet Protocol based transmission scheme, and said file partition handlers communicates with a server using UDP ports; and
   assigning an additional segment of said partitioned media object to said file partition handler for transmission.

2. The method of claim 1, wherein said master controller and file partition handlers are part of a server used to transmit said media object.

* * * * *